(12) United States Patent
Alton

(10) Patent No.: US 6,274,858 B1
(45) Date of Patent: Aug. 14, 2001

(54) BENDS IN A COMPACT CIRCULARLY POLARIZED MICROWAVE FEED

(75) Inventor: William J. Alton, Pepperell, MA (US)

(73) Assignee: The Ferrite Company, Hudson, NH (US)

(*) Notice: Subject to any disclaimer, the term of this patent is extended or adjusted under 35 U.S.C. 154(b) by 0 days.

(21) Appl. No.: 09/585,137

(22) Filed: Jun. 1, 2000

(51) Int. Cl.[7] .................................................... H05B 6/70
(52) U.S. Cl. .......................... 219/695; 219/697; 219/746; 219/750; 333/249
(58) Field of Search .................................. 219/695, 696, 219/697, 690, 685, 746, 750; 333/248, 249

(56) References Cited

U.S. PATENT DOCUMENTS

| | | | |
|---|---|---|---|
| 3,564,458 | * 2/1971 | Cumming | 219/695 |
| 3,742,394 | * 6/1973 | VanKoughnett et al. | 219/696 |
| 4,361,744 | * 11/1982 | Mercier et al. | 219/746 |
| 4,684,776 | * 8/1987 | Heard | 219/750 |
| 6,034,362 | * 3/2000 | Alton | 219/746 |

* cited by examiner

Primary Examiner—Philip H. Leung
(74) Attorney, Agent, or Firm—Hamilton, Brook, Smith & Reynolds, P.C.

(57) ABSTRACT

A feed that provides circularly polarized microwave energy such as for energizing a microwave oven cavity. The feed includes a transformer to match a linearly polarized rectangular waveguide to a polarization waveguide section which may be circular or square in cross section. The polarization waveguide section contains an asymmetrical element that provides symmetry about a plane only. The asymmetrical element therefore introduces a difference in microwave electrical phase for polarizations which are respectively parallel to and perpendicular to the symmetry plane. A second waveguide section having a bend is also used in the feed assembly. The second waveguide section, which may for example be a bent section of circular waveguide, also presents an electromagnetic symmetry about a plane only. As a result, the two waveguide sections operating together provide circularly polarized energy at constant magnitude but continually rotating phase.

33 Claims, 12 Drawing Sheets

BENDS IN A COMPACT CIRCULARLY POLARIZED MICROWAVE FEED

BACKGROUND OF THE INVENTION

Microwave ovens, now a more or less permanent fixture in many home kitchens, increasingly find use in high volume industrial applications. For example, the tempering of large quantities of frozen meat, fish, poultry and fruit is greatly enhanced with the use of microwave ovens. Not only do microwave ovens provide for greater predictability in processing, they also eliminate an otherwise several hour wait time to thaw a frozen product prior to its availability for use, while minimizing drip loss and improving sanitation.

It has been known for some time that microwave ovens preferably include some type of structure for promoting uniformity of microwave energy distribution within the cooking cavity. This is because in a typical box shaped microwave oven, the spatial distribution of the microwave energy tends to be non-uniform. As a result, hot spots and cold spots are produced at different locations. Cooking results are therefore unsatisfactory under such conditions because some portions of the food may be completely cooked while others are barely warmed. This problem becomes more severe with foods which do not readily conduct heat from the areas which are heated by microwave energy to those areas which are not. An example of a food falling within this class is cake. However, other foods frequently cooked in microwave ovens, such as meat, also produce unsatisfactory results if the distribution of energy within the cavity is not uniform.

The conventionally accepted explanation for non-uniform cooking patterns is that electromagnetic standing wave patterns, known as modes, are set up within the cooking cavity. Within such a standing wave pattern, the intensities of the electric and magnetic fields vary greatly with position. The precise configuration of the standing wave or mode pattern is dependent upon at least the frequency of the microwave energy used to excite the cavity and upon the dimensions of the cavity itself.

There have been a great many approaches proposed for alleviating the problem of non-uniform energy distribution. A common approach, used in many domestic microwave ovens, is a device known as a mode stirrer. A mode stirrer typically resembles a fan having metal blades. The mode stirrer rotates continually to alter the mode pattern within the cooking cavity. The mode stirrer may be placed either within the cooking cavity itself (usually protected by a cover constructed of a material that is transparent to microwaves), or to conserve space within the cooking cavity, may be mounted within a recess formed in one of the walls adjacent the cavity. Another approach is to use a carousel tray within the oven cavity, which rotates the food itself.

Yet another approach to the problem of non-uniform energy distribution is to introduce a polarized energy beam into an oven cavity using a number of phased feed points, or to use an antenna including one or more planar conductive plates that are mechanically rotated.

Unfortunately, while these approaches work somewhat for power levels typical of microwave ovens intended for use in domestic kitchens, they are not particularly adaptable for use in high volume industrial applications. It is not uncommon for an industrial microwave oven, for example, to be required to process several hundred kilograms of product in a several minute time span, producing radio frequency energy levels of 50 kiloWatts (kW) or more. The known approaches have limitations in power handling due to the use of coaxial sections which intrinsically have less power capability than a waveguide. In addition, the rotating parts used to vary the energy polarization also have power handling and reliability limitations.

One solution to this problem has been described in U.S. Pat. No. 6,034,362 issued to Alton and assigned to The Ferrite Company, Inc. In that design, microwave energy is coupled to many modes of a microwave cavity by generating a circularly polarized microwave signal, whereby a polarization vector of the microwave energy continually rotates. The coupling device includes a transformer to match from an input waveguide polarization, such as provided by a rectangular waveguide, to a circular or square polarization waveguide section. The polarization waveguide section contains an asymmetrical insert element disposed within it such that in the region of the asymmetrical element, electromagnetic symmetry is about a symmetry plane only. The position and dimensions of the polarization insert are selected to introduce a difference in electrical phase of 90° for polarizations which are parallel to and perpendicular to the symmetry plane.

By introducing two linearly polarized components which are 90° out of phase with one another, the resulting sum of microwave energies produced at the output end of the polarizer is circularly polarized with constant amplitude, but with an angle of polarization that continuously rotates. Since the polarization vector continually rotates, microwave energy is coupled to many modes of the enclosure as a result.

SUMMARY OF THE INVENTION

The present invention is a technique for coupling microwave energy to many modes of a microwave oven cavity, by generating a circularly polarized microwave signal in which a polarization vector of the microwave energy continually rotates.

A device constructed according to the invention includes at least one polarization waveguide section and at least one waveguide section having a bend.

The polarization waveguide section contains an asymmetrical polarization insert element disposed within it, such that in the region of the asymmetrical element, electrical symmetry is presented about a symmetry plane only. The position and dimensions of the polarization insert are selected to introduce a difference in electrical phase for polarizations which are parallel to and perpendicular to the symmetry plane. By introducing two linearly polarized components which are out of phase with respect to one another, the resulting sum of microwave energy is circularly polarized with constant amplitude but with an angle of polarization that continually rotates.

The bent waveguide section is coupled to either the input or output of the polarization section. The bent waveguide section has a bend along a major axis of energy propagation through it. The bend is such that an inner radius of the bend is shorter than an outer radius of the bend along the direction of propagation. The bend introduces a phase difference depending upon whether the microwave energy vector is in the plane of or perpendicular to the plane of symmetry of the bend. The bent waveguide section therefore compliments the polarization section by presenting an additional electrical symmetry about a symmetry plane.

The phase difference introduced by both the polarization section and the bent section thus together provide the required overall 90° difference in electrical phase. With proper orientation and dimensioning of the bent section, the required phase shift can be provided largely by the bend.

This reduces the need for the phase difference to be supplied by the polarization section, which in turn permits the polarization section to be significantly reduced in length.

The ability to make use of multiple configurations of bends in waveguide sections not only provides compactness, but also provides additional versatility in the manner of connecting from a microwave energy source to a cooking cavity. For example, certain applications require a compact, low-height feed structure, and the availability of circular bent sections greatly assists in the mechanical layout of such systems.

The invention provides circularly polarized microwave energy with a phase angle that continuously varies to energize many modes of an oven cavity. The continuously varying energization is achieved with no moving parts and with greatly increased power handling capability, since only waveguide type components are used, with no need for mechanically rotating sections, patch antennas, or coaxial lines.

The feed is of particular use in ovens which are adapted for both microwave and hot air or gas heating, since the feed is assembled from fixed, rigid, metal components and does not require mode stirrers or other rotating components.

DETAILED DESCRIPTION OF THE INVENTION

Figure 1:
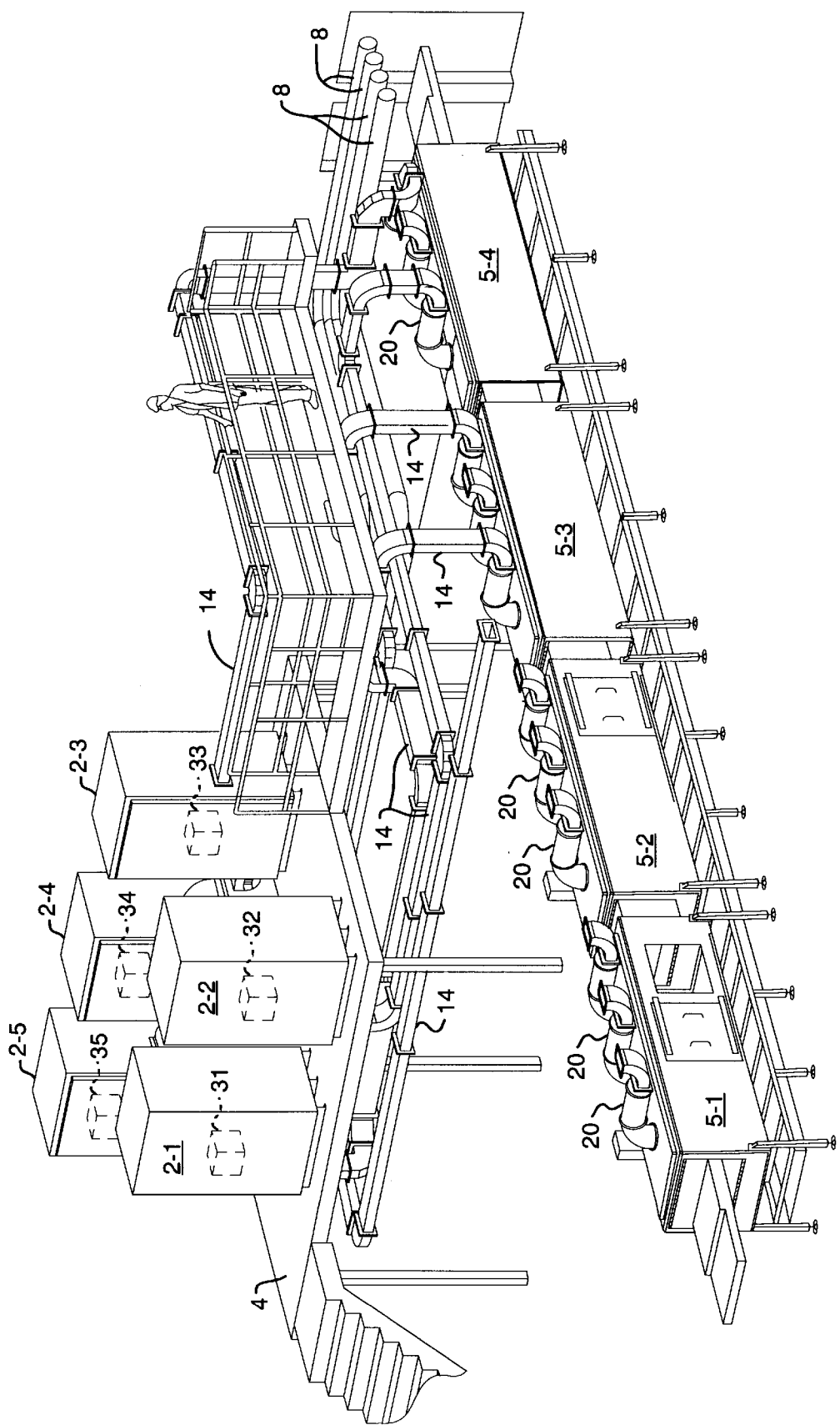
FIG. 1 is a partial perspective view of a single-belt continuous feed type oven system that makes use of circularly polarized feeds according to the invention.

Turning attention now to the drawings more particularly, FIG. 1 illustrates an oven system 1, such as used in a continuous feed industrial application, which makes use of circularly polarized feed assemblies 20 according to the invention. The oven system 1 includes a number of equipment cabinets 2-1, 2-2, . . . , 2-n which enclose microwave energy sources 3. The cabinets 2 are supported by one or more floors 4 located above a series of four individual oven enclosures 15-1, 15-2, 15-3, and 15-4. In the illustrated system 1 there are actually twelve cabinets supported on two different floors 4. For the sake of clarity, only one of the floors 4 and some of the cabinets 2 are shown.

The oven enclosures 15 are arranged in series such that product to be processed is fed from one oven to the next. A conveyer belt 17 is used for holding the product in place as it is processed through the various enclosures 15 in series. One or more door assemblies 16 provide access to the interior of a respective enclosure 15. Vents 18 provide an avenue for steam generated during the cooking process to escape from the enclosures 15.

The present invention is related in particular to how the waveguides 14 couple microwave energy from the energy sources 3 to the interior of the oven enclosures 15 through the feed assemblies 20. Although the illustration depicts only apparatus for microwave cooking, it should be understood that the enclosures 15 may also be a combination type oven or kiln that is also heatable by hot air, gas, infra red or other convection heating techniques as well as microwave heating.

Figure 2:
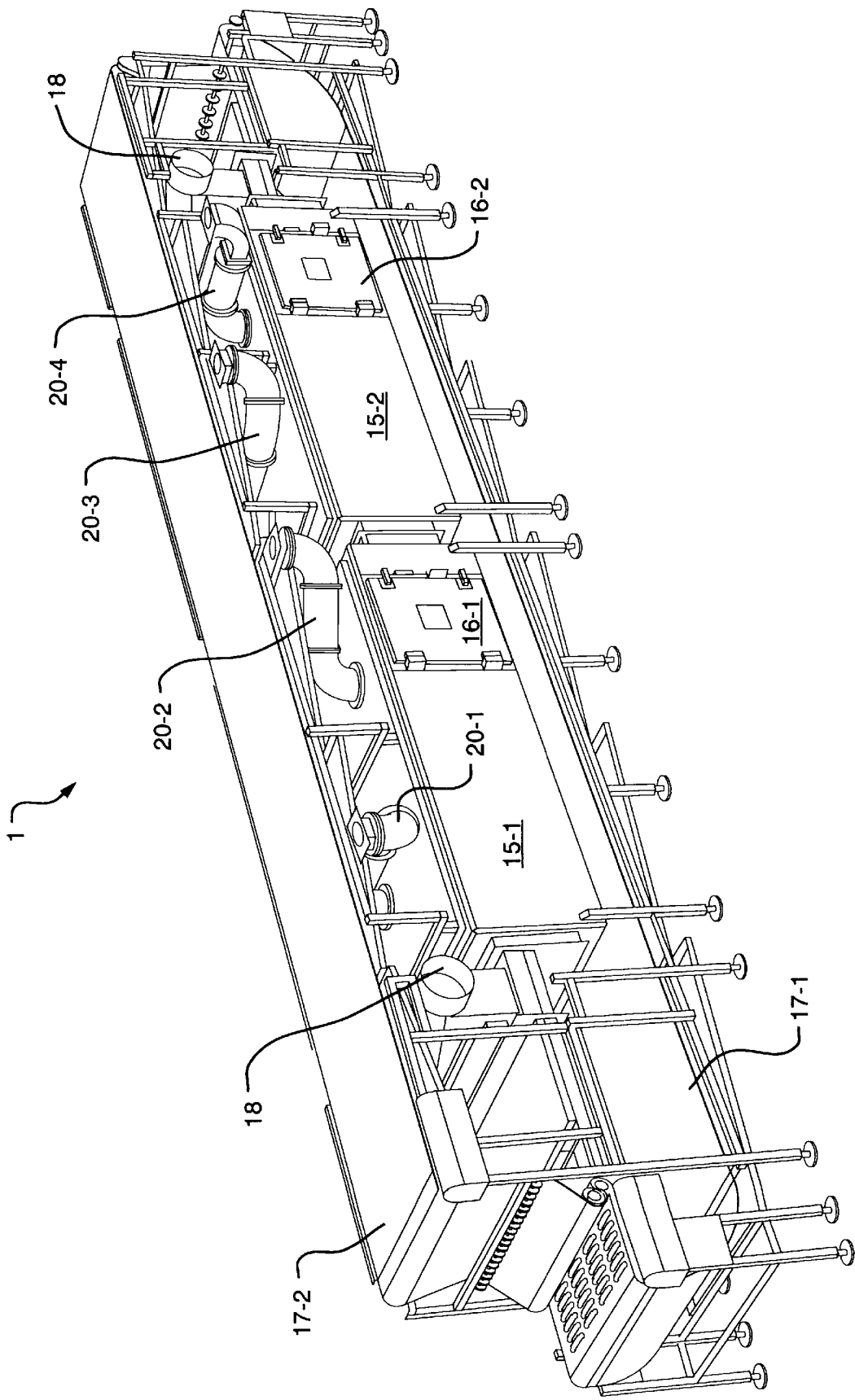
FIG. 2 is a perspective view of a two-belt continuous feed oven showing in more detail how different types of feed assemblies connect to the oven cavities.

FIG. 2 is a closer view of a portion of another oven system 1 illustrated with two enclosures 15-1 and 15-2 with their respective feed assemblies 20-1, 20-2, 20-3 and 20-4. Orientation of the feed assemblies 20 in this application is further constrained by the use of a pair conveyer belts, namely an upper 17-1 and lower belt 17-2. Certain applications, such as the cooking of bacon, require two belts to hold the product flat while processing. This system I provides additional challenges to the designer, who must determine the layout of the enclosures 15, the waveguides 14, while accomodating especially the upper conveyer belt 17-2. As can be appreciated from inspecting FIG. 2, feed assemblies 20 that generally need to be attached to an upper portion of the respective enclosure 15 and then to one of the waveguides 14, must be arranged so as not to interfere with the operation of the upper conveyer belt 17-2.

Figure 3A:
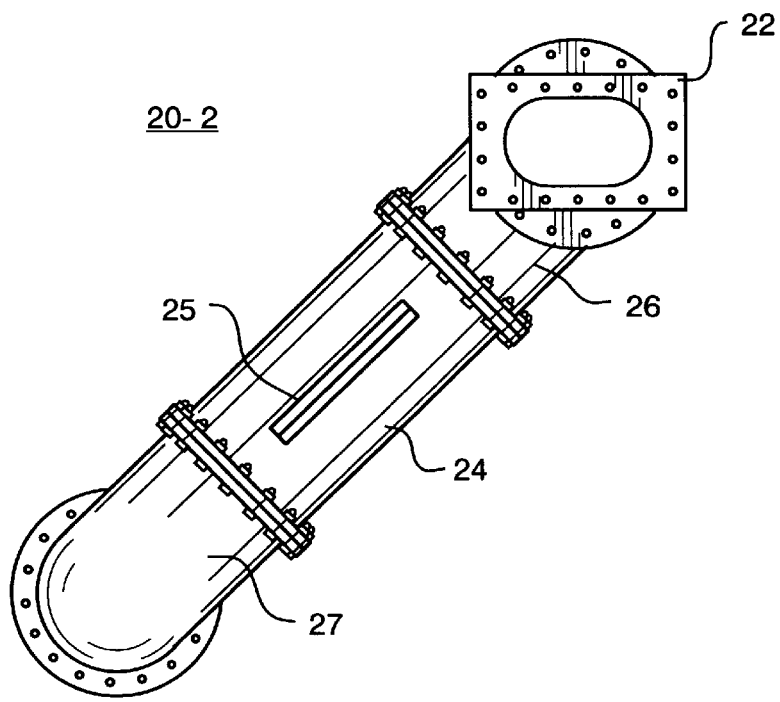
FIGS. 3A and 3B are top and front views of one particular feed assembly.
Figure 3B:
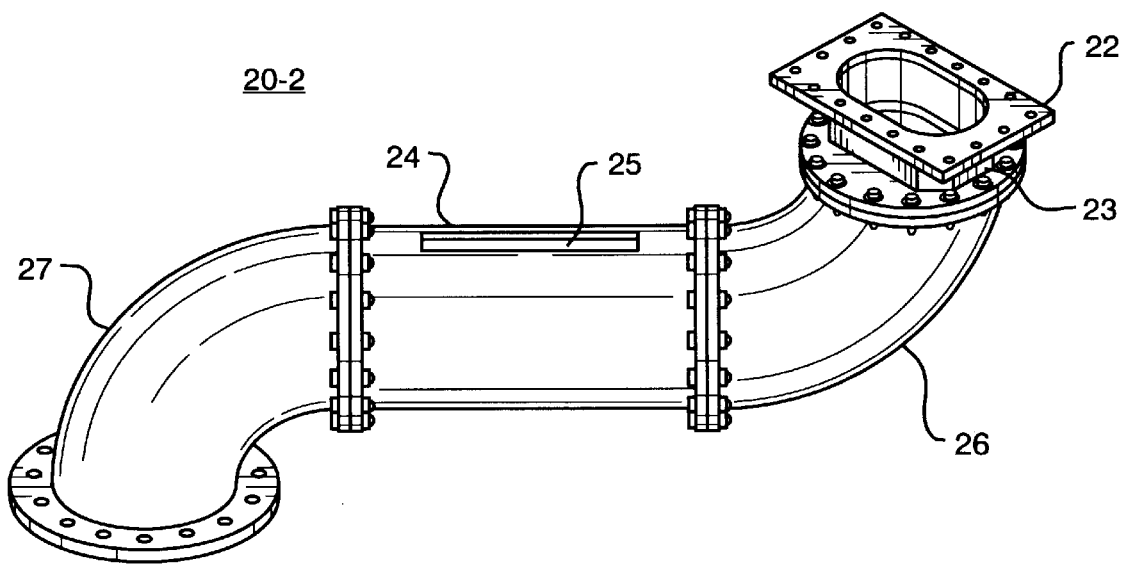

FIG. 3A and 3B are, respectively, a top view and front perspective view of a polarizer feed assembly 20 according to the invention. The feed assembly 20 consists of a flange 22, a rectangular-to-round transformer 23, a coupling cylindrical section 24 having an asymmetrical insert element 25, a first bent waveguide section 26 and a second bent waveguide section 27. The components of the feed assembly 20-2 are machined from a suitable material, such as aluminum, with a chromate golden finish per for example standard MIL-C-5541.

The polarizer feed assembly 20-2 accepts energy from a rectangular input waveguide 14 such as provided in a linearly polarized TEI, mode, and couples such microwave energy at the output of the second bent waveguide section 27 with a circular polarization. The generated circularly polarized microwave signal is one in which the polarization of the microwave energy continually rotates to avoid the setting up of continuous standing waves in the oven enclosures 15. The circular polarization is provided by the cylindrical section and the bent sections 26 and 27 acting together, in a manner which is described more fully below.

Figure 4:
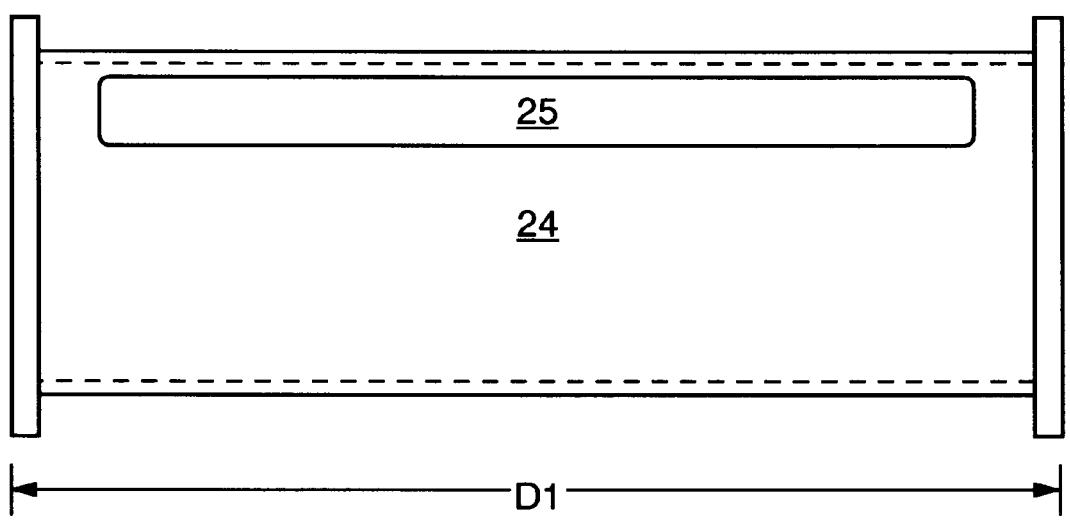
FIG. 4 is a more detailed view of a polarization waveguide section.

FIG. 4 is a more detailed view of the cylindrical section 24. As shown, an insert element 25 is placed within the interior of the cylindrical section 24. In the illustrated embodiment, the feed assembly 20 is designed for operation at approximately 915 MegaHertz (MHz). At this frequency, the length, DI, of the cylindrical section 24 is approximately 19.0 inches (in). This is significantly less than the approximately 30.0 inches associated with the length of a cylindrical section in an embodiment that does not make use of the bent waveguides 26 and 27. The overall length of the feed assembly 20-2 is, therefore, approximately 40.8 inches.

Figure 5C:
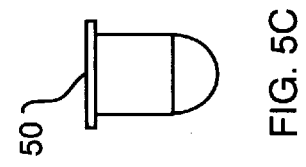
FIGS. 5A, 5B and 5C are top, side, and end views of an insert element.
Figure 5A:
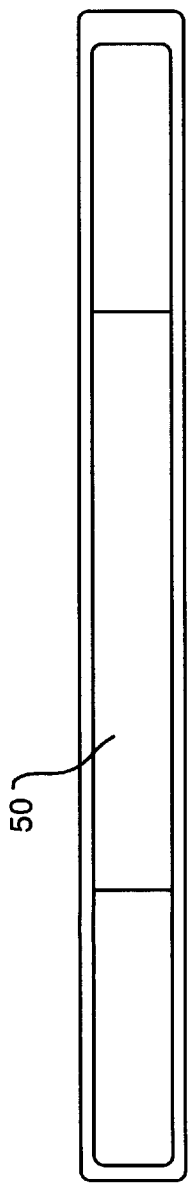
Figure 5B:
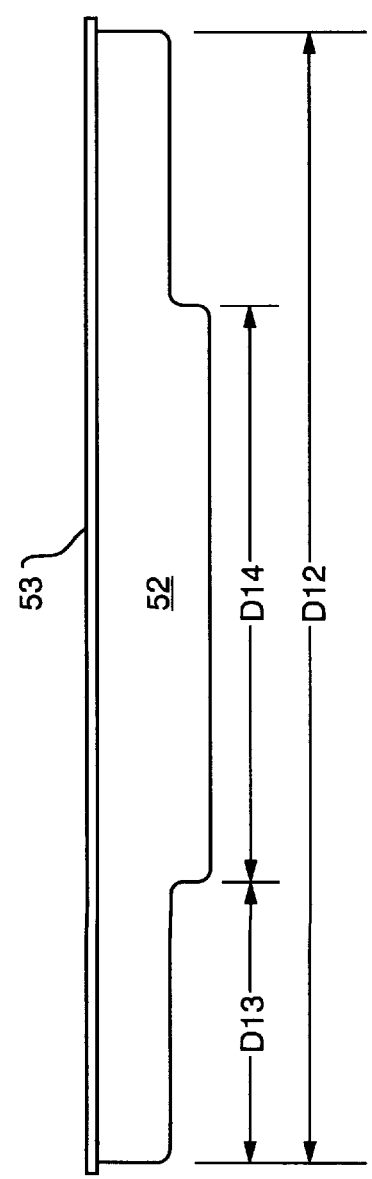

FIGS. 5A, 5B and 5C are top, plan and end views of the asymmetrical insert element 25. The insert 25 consists of a main section 52 and a outer mounting flange 53 for permitting it to be attached to the cylindrical section 24. The insert 25 has a shape which is symmetrical about a plane 50 running through its center. For operation at the aforementioned 915 MHz, the preferred insert has an overall length D12 of approximately 11.5 in, end spacing D13 of 2.8 in, and middle section length D14 of 5.9 in.

The insert 25 is shaped to be self-matched to optimize the transmission of electromagnetic energy through the polarizer.

Figure 6B:
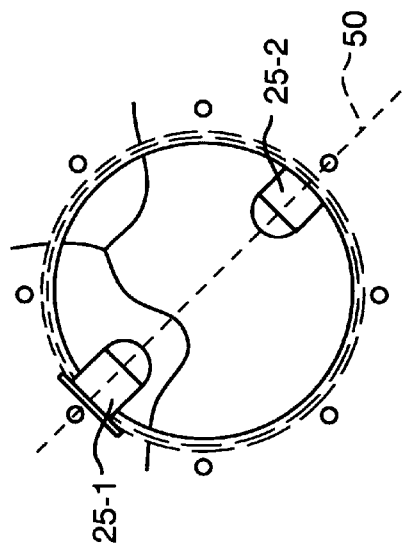
FIGS. 6A and 6B are cross-sectional views of two different configurations for placing the insert element within a waveguide polarization section.
Figure 6A:
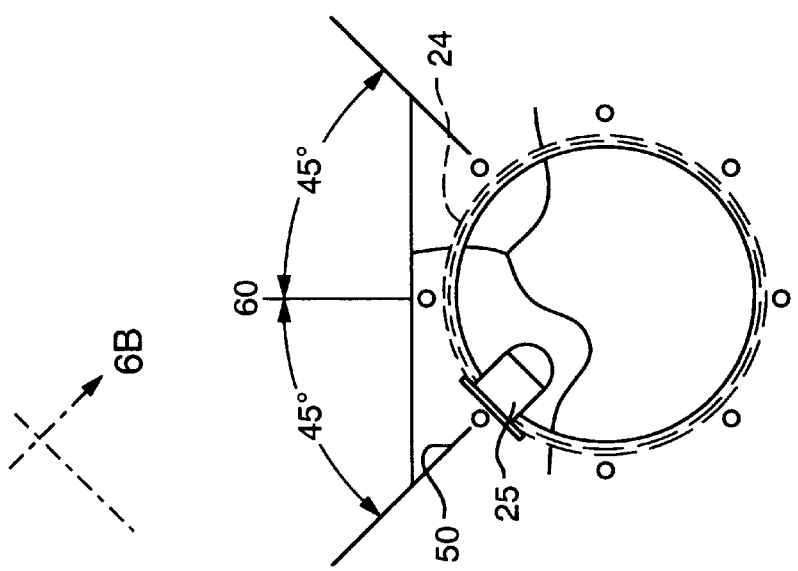

FIG. 6A is an end view of the cylindrical section 24 showing the placement of the insert 25 more particularly. The insert 25 is placed within the interior of the cylindrical section 24 such that electromagnetic symmetry is present about a central plane 50 of the insert only. This causes energy entering the cylindrical section 24 to depart from its linear polarization. In particular, the linearly polarized input microwave energy is presented to the asymmetrical insert 25 at a 45° degree angle with respect to the symmetry plane 50. The result is that energy is presented to the circular section 24 which is in a form equivalent to half parallel to and half perpendicular to the symmetry plane 50.

FIG. 6B illustrates an alternate arrangement in which two insert elements 25-1 and 25-2 are used. In this embodiment, the insert elements 25-1 and 25-2 are placed opposite one another along the symmetry plane 50. The insert elements 25-1 and 25-2 are each shorter in height in this configuration than the single insert element 25 shown in FIG. 6A. This arrangement provides for better impedance matching along the symmetry plane 50 since it provides a more uniform structure along that plane 50.

Although the coupling section 24 illlustrated herein for the preferred embodiment is a cylindrical section 24, a similar effect of providing a waveguide structure that has symmetry about a plane only can also be provided by a rectangular waveguide section 24.

It should be understood that the cylindrical section 24 only provides a portion of the phase shift needed to impart the total desired 90° phase shift for the polarization waveguide 20. This is because the first bent waveguide 25 and second bent waveguide 27 will also provide a phase shift, as discussed below. What is important is that the total vector sum of the energy components exiting both the cylindrical section 24 and the bent section 26 and/or 27 provide the total desired 90° phase shift, to generate electromagnetic energy with a continuously rotating phase angle.

Figure 7C:
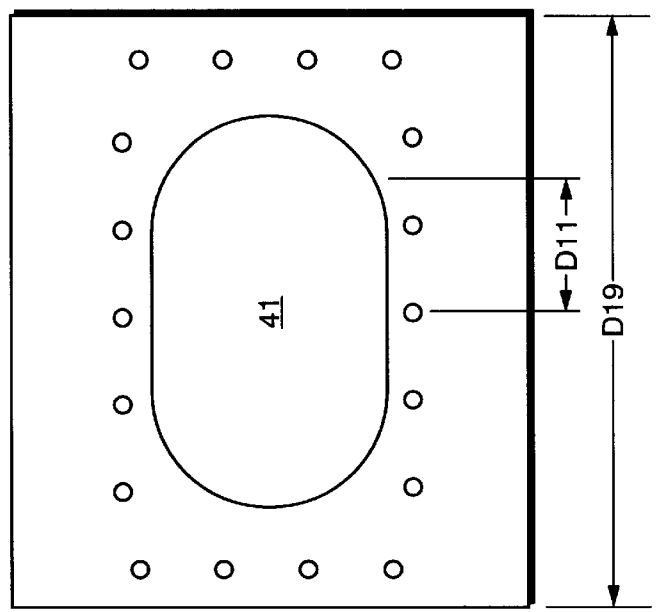
FIGS. 7A, 7B and 7C are rear, cross-sectional, and front views of a transformer.
Figure 7B:
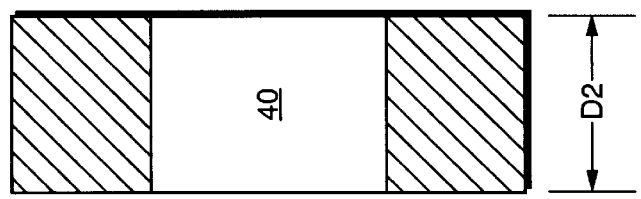
Figure 7A:
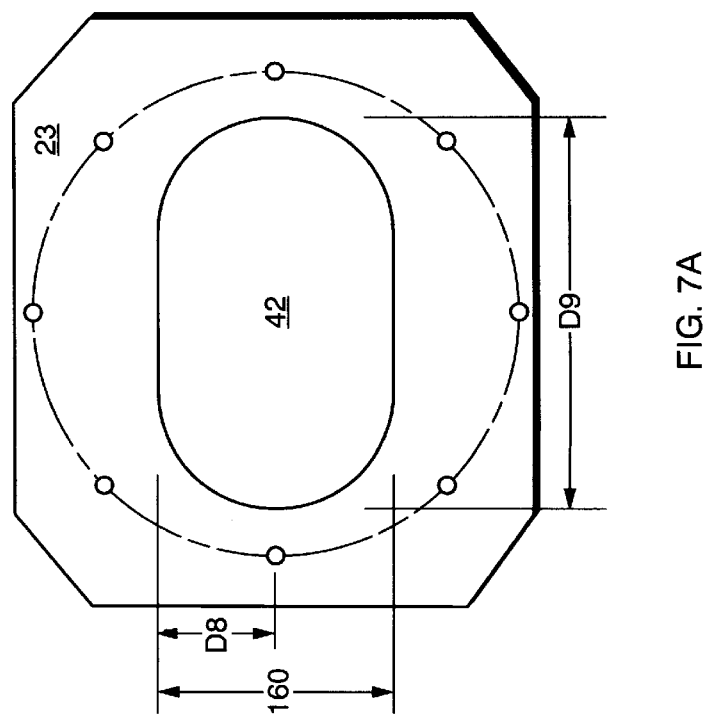

The rectangular to round transformer 23 is more particularly shown in the view of FIGS. 7A, 7B and 7C. The transformer 23 couples microwave energy from a rectangular input waveguide 14 to the feed assembly 20. FIG. 7A is a plan view of the end of the transformer 23 closest to the first bent waveguide section 26. FIG. 7B is a cross-sectional view of the transformer 23, and FIG. 7C is a plan view of the end of the transformer 23 incorporating the flange 22.

The transformer 23 has an opening 40 formed therein to permit passage of microwave energy. The shape of the opening 40 is selected to be a shape that is transitional between the rectangular interior dimension of the rectangular waveguide 14 and the circular interior dimension of the bent waveguide section 26. As shown, the preferred shape is a quasi-ellipsoid having a flat top and bottom, and rounded sides. The ends of the ellipsoid may have a radius D8 of 2.7 inches approximately and an overall width D9 of approximately 8.9 inches. The opening 40 may be centered within a rectangularly shaped block of aluminum having an overall width D10 of 13.5 inches, with the center radius of the outer edge disposed a distance D11 of 2.9 inches from the center of the block. The leading edges of the input side of the transformer 23 may be slightly rounded to encourage energy coupling an enhanced power handling.

For more details of the transformer 23 and coupling cylindrical section 24 including the polarizing insert 25, reference can be had to the aforementioned issued U.S. Pat. No. 6,034,362 entitled, "Circularly Polarized Microwave Energy Feed" issued to Alton on Mar. 7, 2000.

Figure 8B:
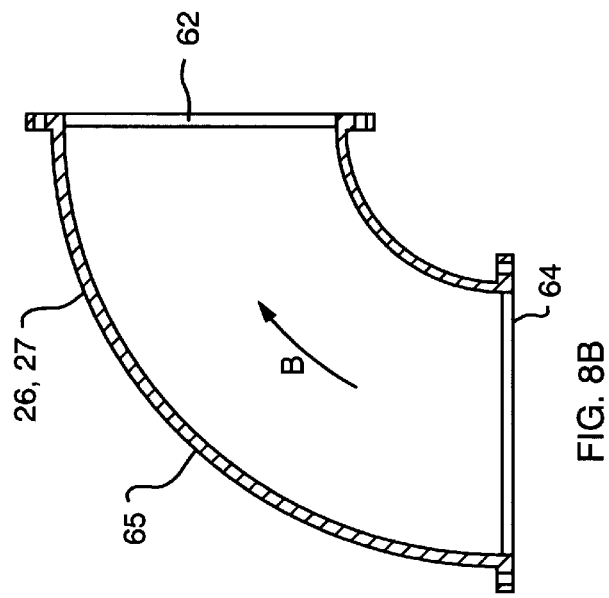
FIGS. 8A, 8B and 8C are front, cross-sectional, and top views of a bent waveguide section having a bend of 90°.
Figure 8C:
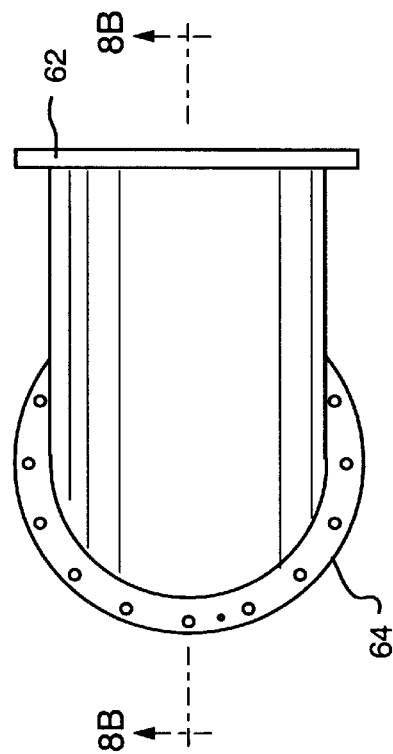
Figure 8A:
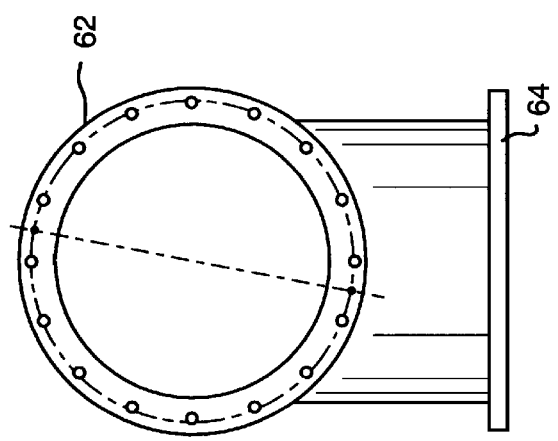

Now turning attention to FIGS. 8A, 8B and 8C the bent circular waveguide sections 26 and 27 can be understood more particularly. Each bent section 26 or 27 includes an upper flange 62 and lower flange 64 to permit the bent waveguide section to be mounted to other waveguide sections. The illustrated bent section 26 is circular in cross-section and provides a 90° mechanical bend for energy traveling along propagation path B.

However, the bent section 26 also introduces an additional change in propagation constant for microwave energy. In particular, the bent section 26 also has an asymmetry such that electrical symmetry is about a single symmetry plane only. For example, the plane shown as plane A in FIG. 8C is such a plane of symmetry. The bent section 26 therefore introduces a phase difference depending upon whether the microwave voltage vector for energy entering the section 26 is in the plane of or perpendicular to the plane of symmetry, A.

By making use of the phase difference introduced by the bent sections 26 and 27 in the feed assembly 20, the total required 90° phase difference that needs to be imparted to the energy in total can be supplied at least in part, if not largely, by the bent sections 26 and 27. This in turn is the reason why the required phase difference to be supplied from the cylindrical section 24 can be reduced, therefore permitting the overall length of the cylindrical section 24 to be decreased.

Figure 9A:
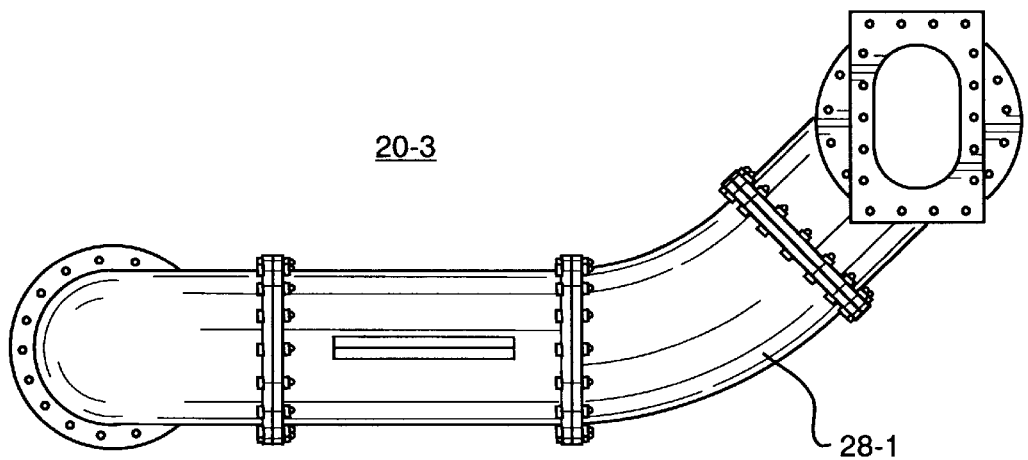
FIGS. 9A and 9B are a top and front perspective view of the feed assembly making use of both 90° and 45° bent waveguide sections.
Figure 9B:
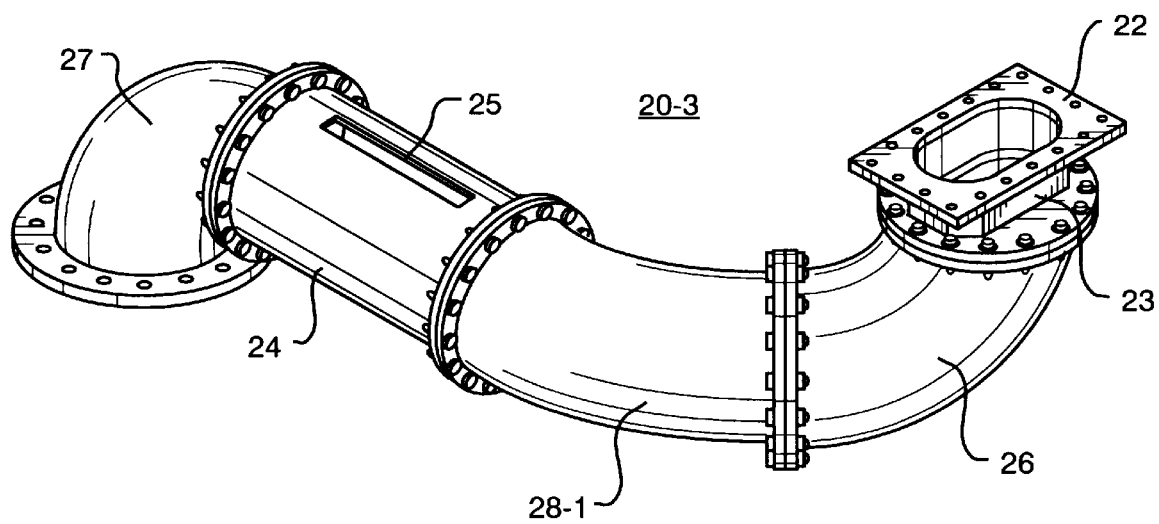

Although the bent section 26 shown in FIGS. 8A, 8B and 8C provides a mechanical 90° turn, it should be understood that other configurations of bends are possible. For example a feed assembly 20-3 shown in FIGS. 9A and 9B makes use of a 45° bent section 28-1. In this implementation, the 45° bent section 28-1 is coupled between the input 90 degrees bent section 26 and the cylindrical section 24 with insert 25.

Figure 10B:
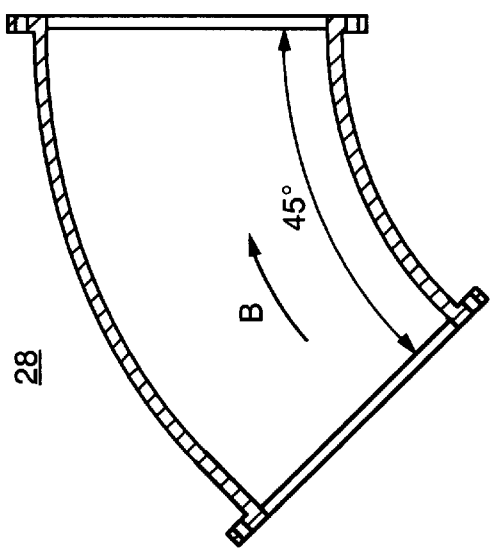
FIGS. 10A, 10B and 10C are front, cross-sectional and top views of a 45° bent section.
Figure 10C:
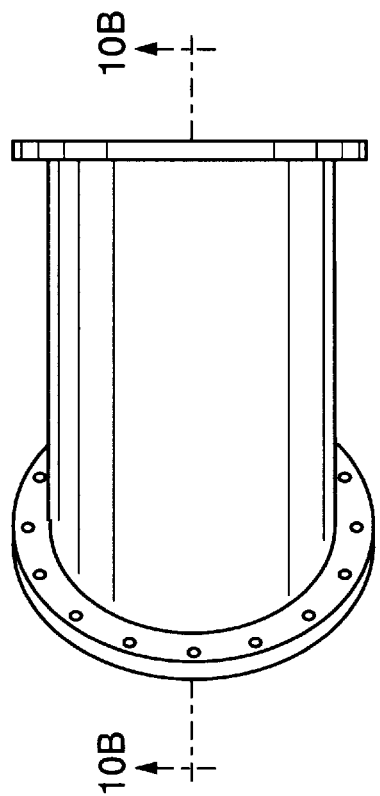
Figure 10A:
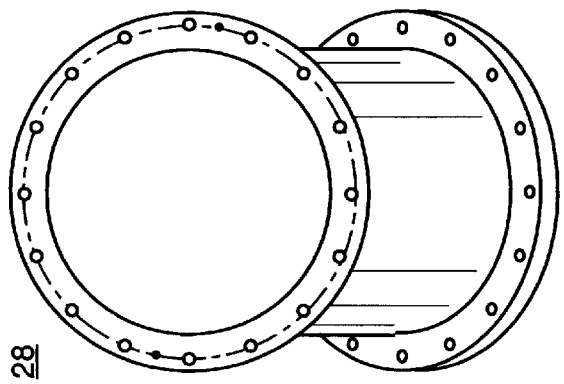

FIGS. 10A, 10B and 10C are, respectively, a front elevational, cross-section, and top view of the 45° bent section 28. The 45° bent section 28 also provides an asymmetry so that electrical symmetry is about a symmetry plane only. The 45° bent section 28 introduces a smaller phase shift but may be useful in applications such as that shown in FIG. 2 where, for mechanical constraint reasons the feed assembly 20 must be provided with additional clearance distance.

Figure 11A:
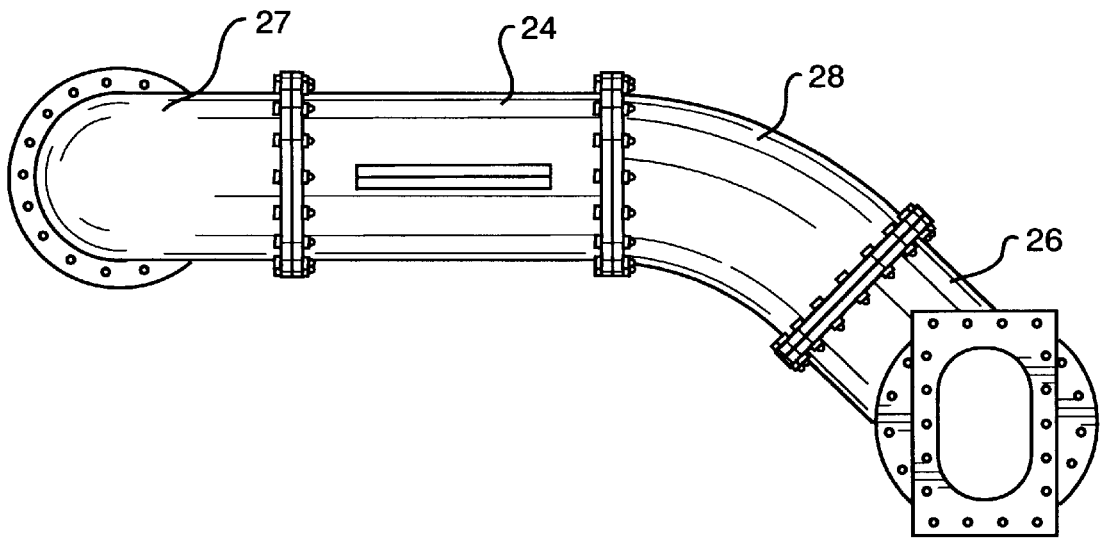
FIGS. 11A and 11B are a top and front perspective view of another feed assembly making use of both 90° and 45° bent waveguide sections.
Figure 11B:
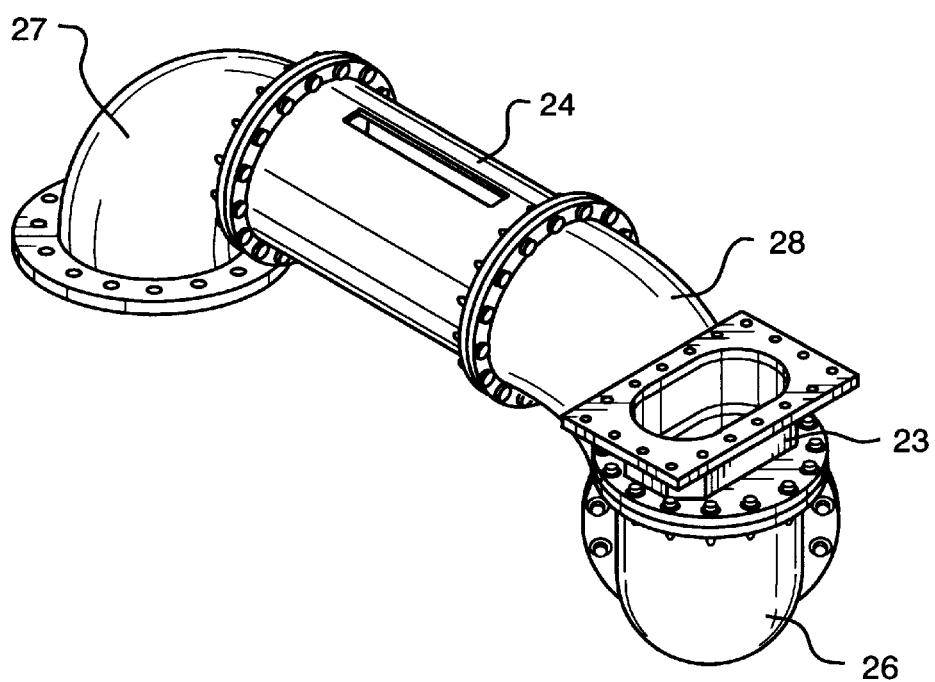

FIGS. 11A and 11B show other configurations that are possible using the described cylindrical section 24 with bent sections 26, 27 and 28. In this embodiment, the bent section 28 has an elongated access of curvature as compared to the bent sections shown in FIG. 8A.

Figure 12A:
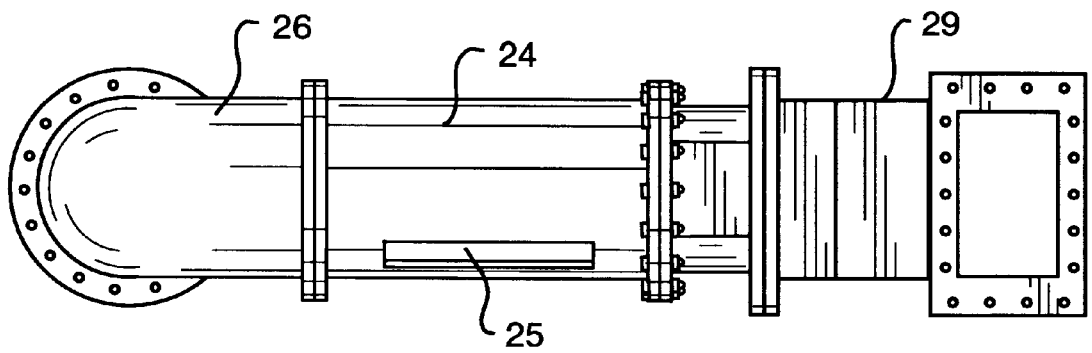
FIGS. 12A and 12B are a top and front perspective view of a feed assembly making use of a rectangular waveguide input section.
Figure 12B:
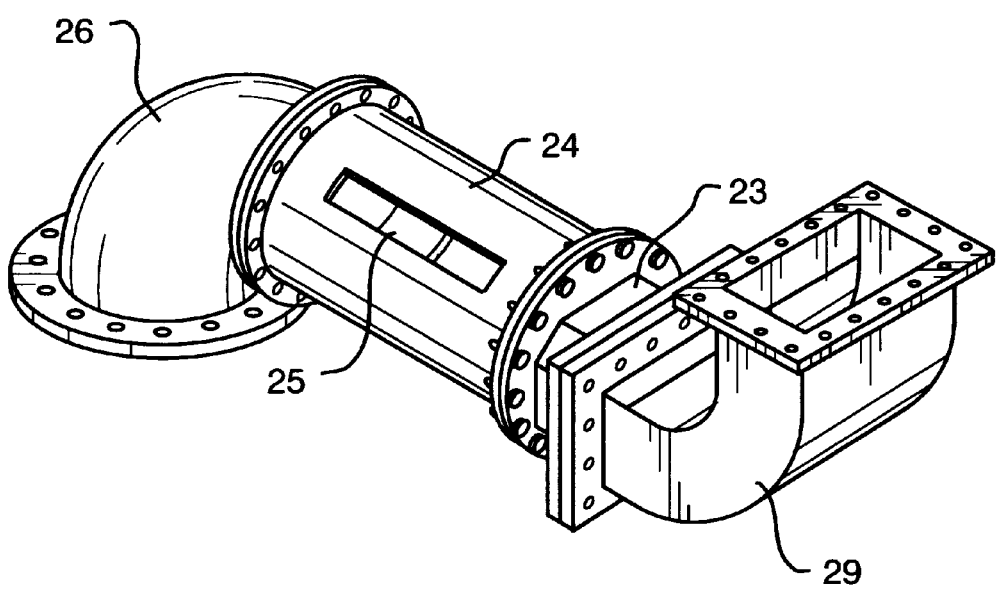

FIG. 12A is an embodiment of the invention in which a different configuration of transformer 28 is used. In this embodiment, the transformer 23 is removed to the exit point of a rectangular waveguide 29, directly at the input to the cylindrical section 24. As with the other embodiments shown in FIGS. 10 and 11, the exact dimensions of the feed assembly 20 will depend upon the phase difference imparted by the bent section 26 having electrical symmetry about a plane only, as well as that provided by the cylindrical section 24 with the insert element 25 which also provides the symmetry plane.

What is important and relevant to the present invention is recognizing that waveguide sections having bends thereal-ong also introduces an asymmetry because of the fact that the distance traveled by energy traveling along, for example, the inner radius of the bend travels much a shorter distance than energy traveling along the outer radius of the bend. This introduces asymmetry to energy traveling through a bent waveguide to implement a change in propagation constant. In this instance, this property can be used to encourage the transformation of input rectangularly polarized energy to circularly polarized energy with a constantly rotating phase angle.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. For example, the asymmetric insert 25 may be disposed at a 45 degree angle to the walls of a square waveguide section 24 to accomplish the same result. In addition, the circularly polarized feed is suitable for any type of microwave oven cavity, including batch and continuous belt processing systems. Those skilled in the art will recognize or be able to ascertain using no more than routine experimentation, many equivalents to the specific embodiments of the invention described specifically herein. Such equivalents are intended to be encompassed in the scope of the appended claims.

What is claimed is:

1. A polarizing feed for a microwave oven, the feed coupling microwave energy originating from an input waveguide into an oven enclosure, the feed comprising:

(a) a transformer for coupling to microwave energy provided by the input waveguide;

(b) a coupling waveguide connected to the transformer, for coupling to microwave energy received from the transformer;

(c) an asymmetrical element disposed within an interior portion of the coupling waveguide, the asymmetrical element having a shape such that it presents symmetry to microwave energy about a symmetry plane; and (d) a bent waveguide connected to the coupling waveguide, the bent waveguide having a bend along a dimension of energy propagation therein, the bend such that an inner radius of the bend is shorter than an outer radius of the bend along the direction of propagation, to present an additional electrical symmetry about a symmetry plane for microwave energy traveling through the feed.

2. An apparatus as in claim 1 wherein the polarization of energy presented to the asymmetrical element is at a 45 degree angle with respect to the symmetry plane within the coupling waveguide.

3. An apparatus as in claim 2 wherein the energy produced by the coupling waveguide is circularly polarized.

4. An apparatus as in claim 1 wherein the bent waveguide is a circular waveguide.

5. An apparatus as in claim 1 wherein the bent waveguide is coupled to an exit point of the coupling waveguide.

6. An apparatus as in claim 1 wherein the input waveguide operates in the $TE_{11}$ mode.

7. An apparatus as in claim 1 wherein the asymmetrical element is shaped to provide provide self-matching to optimize transmission of energy through the coupling waveguide.

8. An apparatus as in claim 1 wherein the bend in the bent waveguide is 90 degrees.

9. An apparatus as in claim 1 wherein the bend in the bent waveguide is 45 degrees.

10. An apparatus as in claim 1 where the polarizing feed is attached to a cavity that provides for cooking by heat energy as well as by microwave energy.

11. A apparatus as in claim 1 additionally comprising (e) a second asymmetrical element disposed within an interior portion of the coupling waveguide along the symmetry plane opposite the other asymmetrical element.

12. A method for coupling microwave energy to multiple modes of a cavity comprising the steps of:

providing energy at an input polarization to a polarization waveguide section which contains an asymmetrical element having a shape such that it presents symmetry to microwave energy about a plane; and presenting energy exiting from the polarization waveguide section to an exit waveguide section, the exit waveguide section having a bend along a direction of microwave energy propagation therein, the bend such that an inner radius of the bend is shorter than an outer radius of the bend so that the bend introduces an additional electrical symmetry about a symmetry plane.

13. A method as in claim 12 wherein the polarization of the energy presented to the asymmetrical element is at a 45 degree angle with respect to the symmetry plane.

14. A method as in claim 12 wherein the energy exiting from the polarization waveguide section is circularly polarized.

15. A method as in claim 12 wherein the polarization waveguide section is a circular waveguide.

16. A method as in claim 12 wherein the polarization waveguide section is a square waveguide.

17. A method as in claim 12 wherein the polarization waveguide section operates in the $TE_{11}$ mode.

18. A method as in claim 12 where in the asymmetrical element is shaped to provide an impedance match between the polarization waveguide section and the exit waveguide section.

19. A method as in claim 12 wherein the exit waveguide section is a circular waveguide.

20. A method as in claim 12 wherein the exit waveguide section has a bend of 90 degrees.

21. A method as in claim 12 wherein the exit waveguide section has a bend of 45 degrees.

22. A method as in claim 12 where the polarizing waveguide section is attached to an oven that provides for cooking by both heat and microwave energy.

23. A method for coupling microwave energy to multiple modes of a cavity comprising the steps of:

providing energy at an input polarization to a polarization waveguide section which contains an asymmetrical element having a shape such that it presents symmetry to microwave energy about a plane; and presenting energy entering the polarization waveguide section from an input waveguide section, the input waveguide section having a bend along a direction of microwave energy propogation therein, the bend such that an inner radius of the bend is shorter than an outer radius of the bend so that the bend introduces an additional electrical symmetry about a symmetry plane.

24. A method as in claim 23 wherein the polarization of the energy presented to the asymmetrical element is at a 45 degree angle with respect to the symmetry plane.

25. A method as in claim 23 wherein the energy exiting from the polarization waveguide section is circularly polarized.

26. A method as in claim 23 wherein the polarization waveguide section is a circular waveguide.

27. A method as in claim 23 wherein the polarization waveguide section is a square waveguide.

28. A method as in claim 23 wherein the polarization waveguide section operates in the $TE_{11}$ mode.

29. A method as in claim 23 where in the asymmetrical element is shaped to provide an impedance match between the polarization waveguide section and the input waveguide section.

30. A method as in claim 23 wherein the input waveguide section is a circular waveguide.

31. A method as in claim 23 wherein the input waveguide section has a bend of 90 degrees.

32. A method as in claim 23 wherein the input waveguide section has a bend of 45 degrees.

33. A method as in claim 23 where the polarizing waveguide section is attached to an oven that provides for cooking by both heat and microwave energy.

* * * * *